Aug. 8, 1950

R. L. M. LE QUEAU 2,517,578

CODE SIGNALING DEVICE

Filed Sept. 8, 1947

5 Sheets-Sheet 1

INVENTOR
ROGER L. M. LE QUEAU
BY Robert Harding Jr.
ATTORNEY

Aug. 8, 1950 R. L. M. LE QUEAU 2,517,578

CODE SIGNALING DEVICE

Filed Sept. 8, 1947 5 Sheets-Sheet 2

INVENTOR
ROGER L. M. LeQUEAU
BY Robert Harding Jr.
ATTORNEY

Aug. 8, 1950

R. L. M. LE QUEAU

CODE SIGNALING DEVICE 2,517,578

Filed Sept. 8, 1947

5 Sheets-Sheet 3

INVENTOR
ROGER L. M. LEQUEAU
BY
Robert Harding Jr
ATTORNEY

Aug. 8, 1950 R. L. M. LE QUEAU 2,517,578

CODE SIGNALING DEVICE

Filed Sept. 8, 1947 5 Sheets-Sheet 4

INVENTOR
ROGER L. M. LEQUEAU
BY Robert Harding Jr.
ATTORNEY

Aug. 8, 1950

R. L. M. LE QUEAU 2,517,578

CODE SIGNALING DEVICE

Filed Sept. 8, 1947

5 Sheets-Sheet 5

INVENTOR
ROGER L. M. LE QUEAU
BY Robert Harding Jr.
ATTORNEY

Patented Aug. 8, 1950 2,517,578

UNITED STATES PATENT OFFICE 2,517,578

CODE SIGNALING DEVICE

Roger Louis Marie Le Quéau, Paris, France, assignor to International Standard Electric Corporation, New York, N. Y., a corporation of Delaware Application September 8, 1947, Serial No. 772,741
In France May 28, 1946

8 Claims. (Cl. 177—353)

It has often been suggested in telephone communication systems to use a code numbering arrangement instead of a decimal system, particularly in the case of networks with several transit exchanges. Each of the numbers composing the signal to be sent is a combination of a small number of signals. This permits the saving of time in the case of several transmissions and this saving in time may be increased if there is no interval of time between the different signals. One object of the present invention is to provide a coded numbering system in which the number and the duration of the signals are reduced.

According to one of the features of the invention a code is used composed of a succession of signals. Each of the said signals may be followed by an interval of time which is translated by the receiving system as a code element, and may follow immediately the preceding signal if it is distinct from this signal in such a way that the end of one signal is marked by the beginning of the following signal.

According to another feature of the invention it is possible in the case of a code composed of a small number of elements, not to leave any interval of time between the transmission of each number, except when the last signal and the first signal of the following number are identical and this without possibility for the receiver to interpret the said interval as a code element.

Other features of the invention will appear in the following description of one embodiment given as an example in relation to the drawings in which:

Figures 1*a*, 1*b*, 1*c* and 1*d* show the circuit of a receiver.

Figure 3 illustrates the manner in which

Figure 1A:
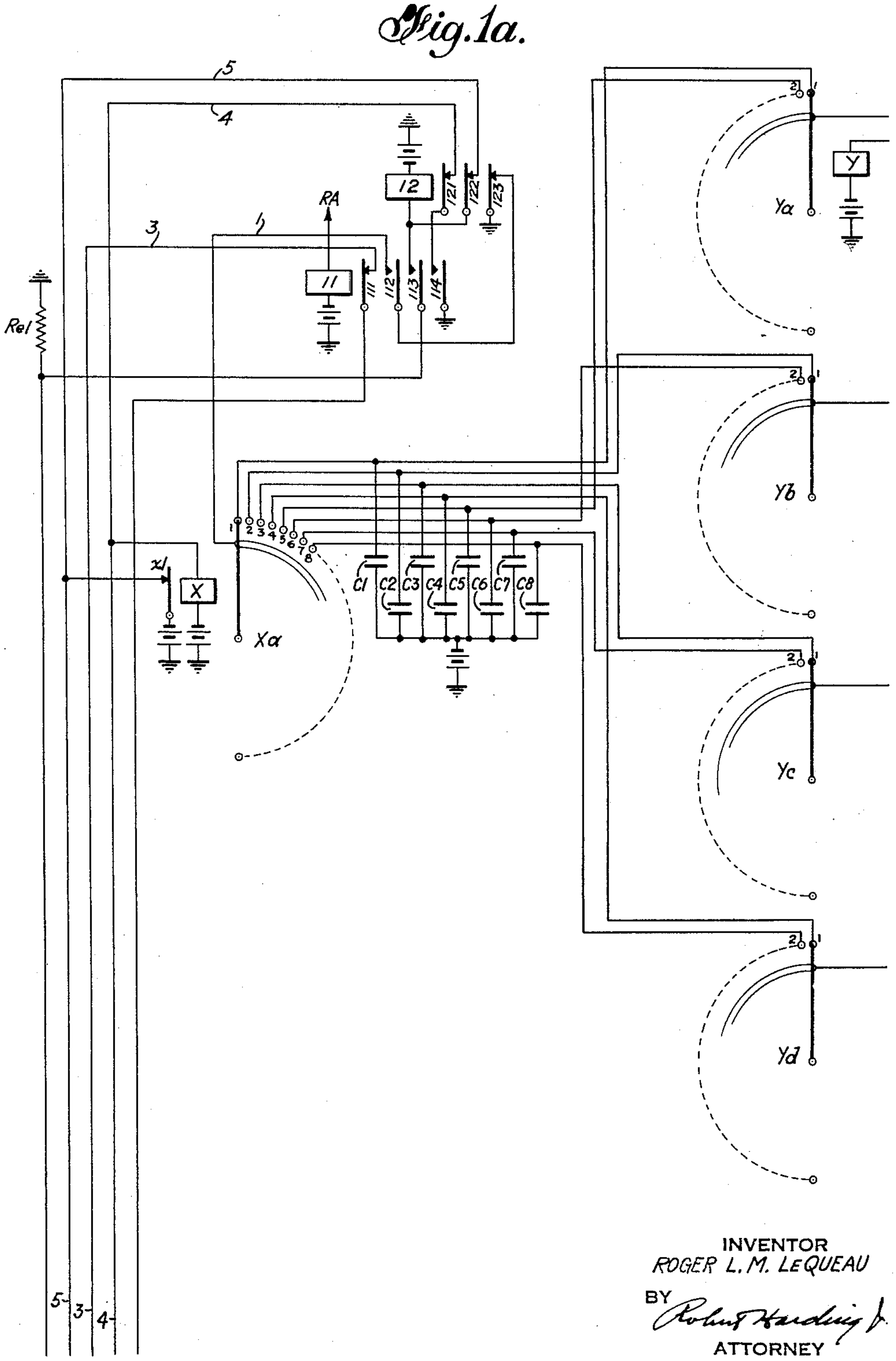
Figures 1*a*, 1*b*, 1*c* and 1*d* are joined to form the receiver of this invention.

In the embodiment described the code used is composed of a succession of four elements of which three only are different. It will be assumed that only two different signals A and B are used, the third code element or zero being, according to the invention, characterized by the absence of any signal. Signals A and B may be for example characterized by two different electric signals on the same line wire, different in polarity and amplitude in the case of a direct current, or in amplitude or frequency or phase, in the case of an alternating current.

With the three elements AB and 0 it is possible to obtain the 16 following code arrangements:

| | | | |
|---|---|---|---|
| ABAB | A0AB | BABA | B0AB |
| ABA0 | A0A0 | BAB0 | B0A0 |
| AB0A | A0BA | BA0A | B0BA |
| ABOB | A0B0 | BA0B | B0B0 |

Ten (10) of these code arrangements may be used to characterize the numbers 0 to 9; the others are available for the transmission of special signals or for other purposes.

The arrangements by which it is possible to send such codes being known they are not part of the invention and only the receivers will be described with reference to the accompanying drawings.

In the following discussion the relays of the respective circuits are designated by the reference characters 11 to 25 while the armature contacts associated with the relays are designated by the associated relay reference character followed by the number of the particular armature contact. For instance, the first contact of relay 11 would be designated as contact 111 while the second contact of this relay would be designated as contact 112 and so forth.

The contacts of the rotary switches are shown in accepted schematic representation wherein letters characterize the switch to which the contact is associated, numerals designate the wipers for which the switch closes its contact, and a subreference letter added to the switch reference is used to designate the wiper which closes the said contact. Each switch is a rotary switch, the wipers of which are moved by an electromagnet. For the sake of simplification the same letter is to be used to designate the operating magnet and the switch associated to said magnet. Let us assume that the signal code ABA0 is received. In the rest position the relays shown in Figures 1*a*, 1*b*, 1*c* and 1*d* are in the idle position, as well as the switches Y and Z. The switch X on the contrary is in position 1.

When the "A" signal is received ground will be connected to wire RA, Figure 1*a*, causing relay 11 to operate. At make contact 112 relay 11 will complete a circuit to charge the condenser C—1 through battery, condenser C—1, wiper of switch X in position 1, wire 1, contact 112, break contact 123 of relay 12, ground; at make contact 113 it will prepare a circuit for the operation of relay 12 (at present short circuited by break contact 122) through wire 5, break contact of X1, associated with the operating magnet X, and battery; at make contact 114 it completes the circuit of said electro-magnet X through ground, contact 114, break contact 121, wire 4, electro-magnet X, battery. The electro-magnet X attracts its armature and opens in X1 the short circuit on relay 12 which operates.

Figure 1B:
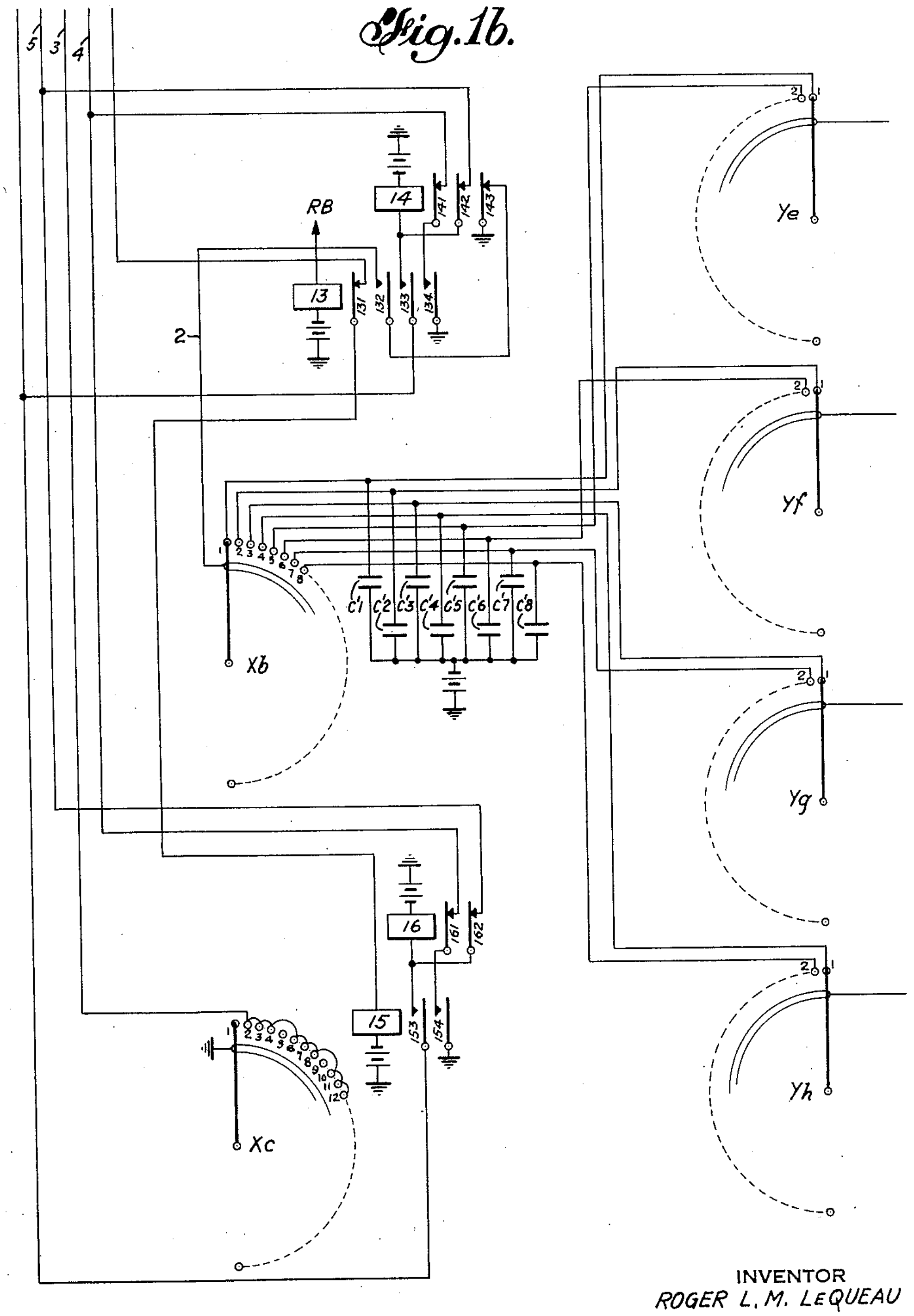

Relay 12, opens at break contact 121 the locking circuit of electro-magnet X which falls back and moves the wipers into position 2; at break contact 122 it prevents any further short circuit of its winding; at break contact 123 it prevents an unwanted charge of condenser C2 which would take place with the switch in position 2. At the end of signal A, when signal B is to be received, the ground is disconnected from wire RA to be placed on wire RB (Figure 1*b*). Relay 13 (Figure 1*b*) operates and relay 11 falls back. In practice, relays, such as 11 and 13 operate more rapidly then they fall back, so that the circuit of relay 15 will not be completed through break contact 111 of relay 11 (Figure 1*a*), wire 3 and wiper C of switch X in position 2.

The operating circuit for relay 12 is open at make contact 113 and it falls back. The cycle of operations which has been mentioned occurs again with the difference that relays 13 and 14 (Figure 1*b*) now operate and since the switch is in position 2 that condenser C'2 is charged. The switch X then moves one step to arrive in position 3.

Signal B ends then and is replaced by signal A. The operation mentioned above for the reception of said signal occurs again with the only difference that it is condenser C3 which is charged with the switch in position 3, and switch X moves one step and arrives in position 4.

The fourth code element is characterized, according to the invention, by the absence of any signal. No signal is then applied to wires RA or RB, relays 11 and 13 remain idle and relay 15 operates by the following circuit: battery, relay 15, break contact 131 of relay 13, break contact 111 of relay 11, wire 3, wiper X*c* of switch X in position 4, ground. The cycle or operations described above for the reception of signal A occurs again, but this time relays 15 and 16 operate and no condenser is charged.

It may be seen that the reception of code ABA0 has caused the condensers C1, C'2 and C3 to be charged. The condensers designated by numeral 1 are used for recording the first code element, the condensers designated by numeral 2 are used for the second element, etc.; the condensers connected by wiper X*a* correspond to signal A and those connected by wiper X*b* to signal B. For the code element 0 (absence of any signal) no condenser is charged as explained above.

The reception of the second number is made in the same manner as the first number, but on condenser C5 to C8 and C'5 to C'8. For the sake of simplification there has been shown in the drawings only the condenser necessary for the recording of the first two numbers but it is clear that the system described applies to the reception of any number of signals which would be achieved by a mere multiplicity of the arrangements described above.

It will be noted that it is not necessary to provide an interval between the reception of successive numbers, as is the practice in decimal basis systems; however, when the last code element corresponding to any number is identical to the first code element corresponding to the next number a sufficient length of time must be left between these two numbers for relays 11 and 12 (or 13 or 14) to fall back, since this is necessary for the normal operation of the circuit. During this "dead time" relay 15 cannot operate because its circuit is not completed, since wiper X*c* of switch X is on one of positions 1, 5, 9, 13 etc. which are not connected as shown with reference to Figure 1*b*.

In the embodiment shown the duration of signals depends on the operation time of the controlling magnet. It is clear that the preceding description has been given only as a non-limiting example and that the switching of the different signals on the appropriate condensers may be made by using instead of rotary switches all relay systems or any other system. The duration of transmission of one signal can be made very short.

Figure 1C:
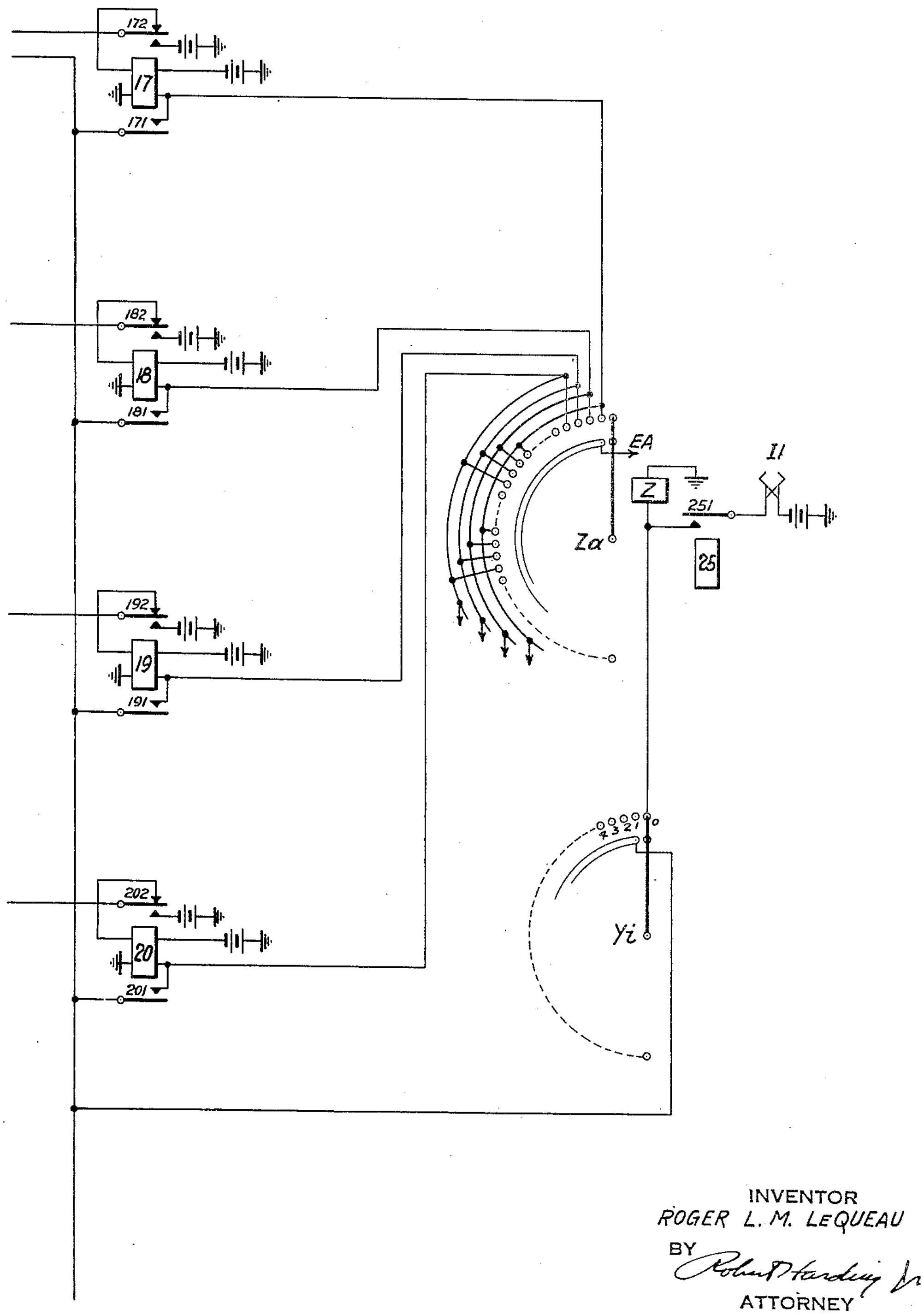
Figure 1D:
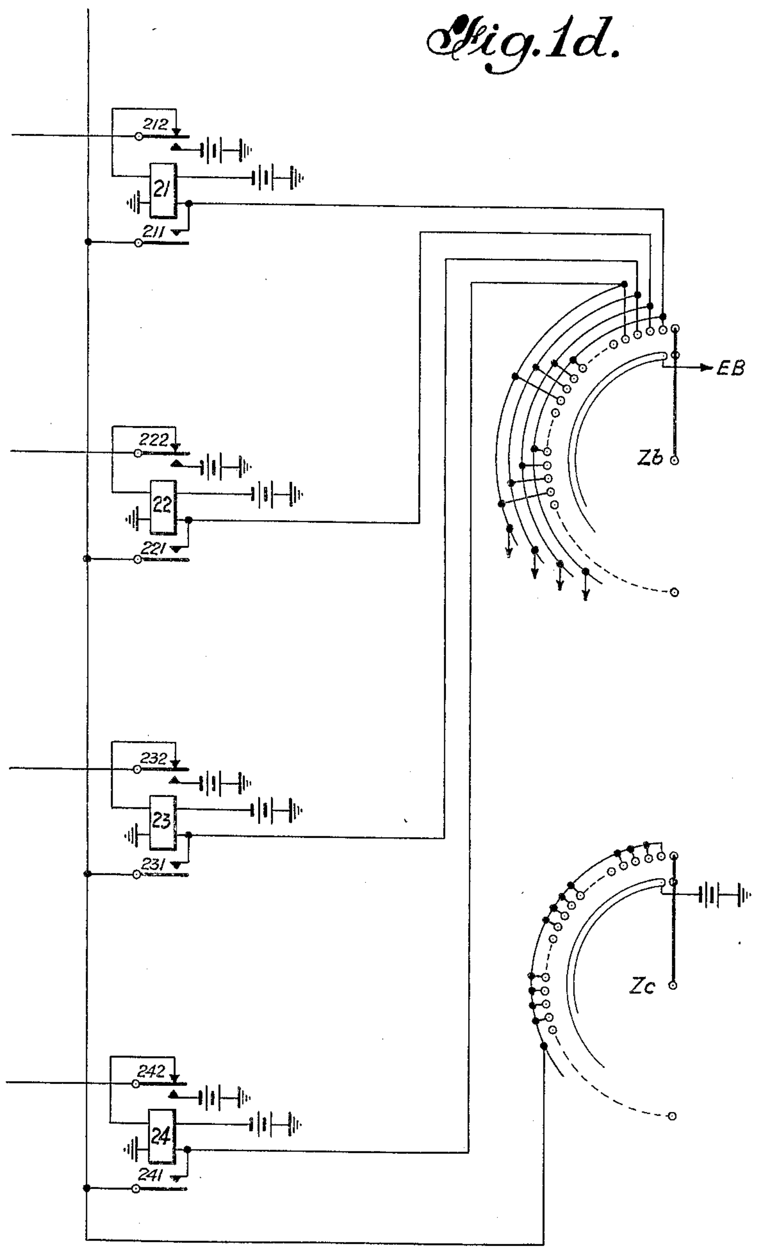

It will now be explained how the received signals are retransmitted. When the apparatus which must receive the first number is in numbering position, make contact 251 associated with relay 25 of Figure 1*c* is closed. When the impulse springs I1 (Figure 1*c*) close their contacts, the following circuits are established: battery, springs I1, make contact 251, wiper *i*, 0 of switch Y in position 0, magnet Y, ground. The magnets Y and Z in series in this circuit operate. When the impulse springs I1 open their contacts, these two electromagnets are deenergized and make their wipers move to position 1. Impulse springs I1 operate at a constant predetermined rate by means not shown.

By its wipers *a* to *h* (Figures 1*a* and 1*b*) switch Y connects respectively relays 17 to 24 to the terminals of condensers C1 to C4, and C'1 to C'4, the condensers C1, C'2, C3 which have previously been charged when the first number was received now discharge, and code relays 17, 22 and 19 connected in the respective circuits of these condensers operate.

Switch Z which operated as above prepares by its wipers *a* and *b* the retransmission of signals and closes by its wiper C to circuit of magnet Y.

Relay 17 closes a locking circuit at make contact 171 through: ground, lower winding of 17, make contact 171, wiper C of switch Z in position 1, battery. It applies also a battery on wire EA (Figure 1*c*) through wiper 1 of switch Z*c*, make contact 171 of relay 17, wiper *a* of switch Z at position 1, wire E*a*, so as to cause the retransmission of signal A; in break contact 172 of relay 17 it opens its operation circuit; at make contact 172 it short circuits condenser C1 through switch Y*a* so that this condenser is completely discharged.

Relays 22 and 19 close at make contact 221 and make contact 191 locking circuits through wiper *c* of switch Z in position 1, open their operating circuits at break contact 222 and break contact 192, and short circuit condensers C'2 and C3 at make contact 222 and make contact 192 similar to the short circuiting of C1 by relay 17.

Switch Z moves by the action of impulse springs I1. Relays 17, 22 and 19, as well as magnet Y are in the meantime operated through: battery, wiper *c* of switch Z in position 2, magnet Y, ground, and in parallel with the preceding circuit, relay 17, 22 and 19. The battery is disconnected from wire EA and applied on wire EB (Figure 1*d*) through: battery, wiper *c* of switch Z in position 2, make contact 221 of relay 22, wiper *b* of switch Z in position 2, wire EB, and this causes the emission of signal B.

When switch Z arrives in position 3 the battery is again connected to wire EA through: wiper *c* of switch Z in position 3, make contact 191 of relay 19, wiper *a* of switch Z in position 3 and wire EA, which causes the retransmission of the third code element A.

When switch Z arrives in position 4 no polarity is applied to wires EA and EB and no signal is transmitted.

The first number characterized by code ABA0 has therefore been completely retransmitted.

When switch Z arrives in position 5, relays 17, 22, 19, whose circuit is open on wiper *a* of switch Z, fall back, as well as magnet Y, and this causes the wipers of switch Y to move to position 2.

The retransmission of the second number is made as it has been explained for the first number with this difference that condensers C5 to C8, C'5 to C'8 are connected in the circuit through the various wipers of switch Y in position 2. It will be noted that several free positions have been left on the terminals of switch Z so as to give to relays 17 to 24 as well as to electromagnet Y, the time necessary for them to fall back. After the retransmission of each number switch Y moves one step to prepare the transmission of the following number.

It must be understood that the drawings show only the circuit elements necessary to understand the operation of the invention. It is clear that in the actual circuits it will be necessary to provide several auxiliary devices, such as means to prevent the retransmission of a number before this number has been completely registered. Other means must be provided also for the return to the rest position of switches XYZ etc.

Figure 2:
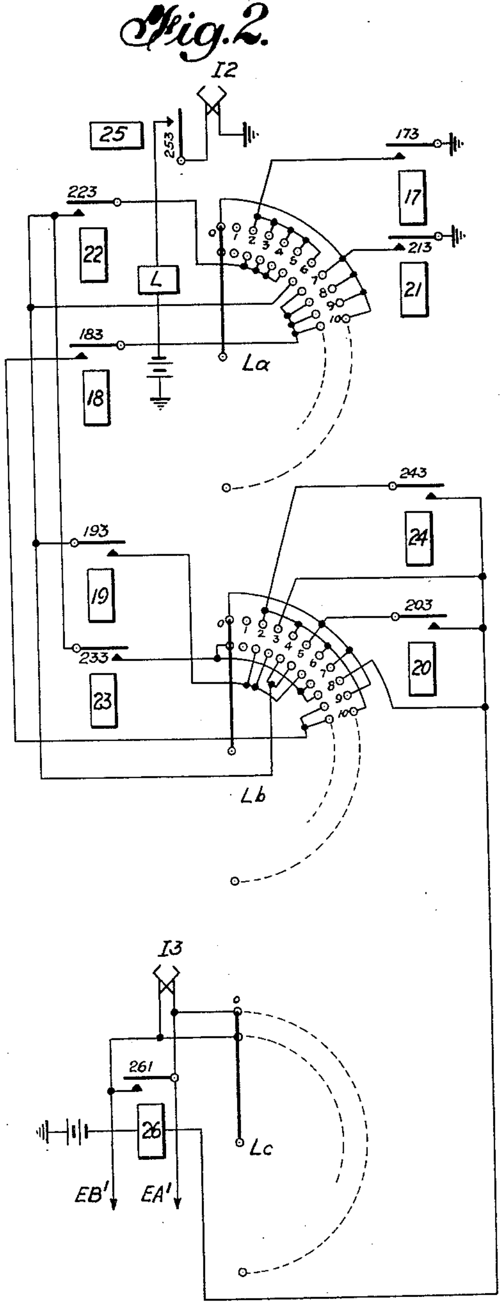
Figure 2 shows an alternative circuit to that of 1*a*, 1*b*, 1*c* and 1*d* for the transmission on a decimal basis.
Figure 3:
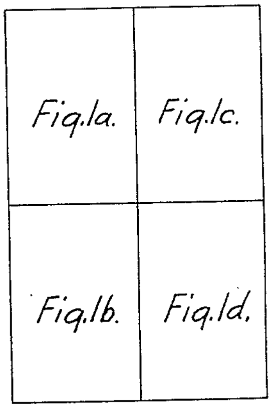

Figure 2 shows an alternative arrangement to that of the above discussed arrangement in which it is possible to retransmit each number on a decimal basis. It wil be assumed, that numbers 0 to 9 are characterized by the following code arrangement.

| | |
|---|---|
| 1. ABAB | 6. BABA |
| 2. ABA0 | 7. BAB0 |
| 3. AB0B | 8. BA0A |
| 4. AB0A | 9. BA0B |
| 5. A0AB | 0. B0BA |

In the preceding example the code received was ABA0 corresponding to number 2 and relays 17, 22 and 19 had been operated. At the time of emission make contact 253 associated with relay 25 closes and makes the switch L move (Figure 2). When this switch passes on to positions 1 and 2, the loop EA', EB' is opened at two points at contacts C of switch L and at the impulse springs I3, which operate at the same speed as the impulse springs I2. When switch L arrives in position 3 the following circuit is completed: ground, make contact 173, wiper *a* of switch L in position 3, make contact 223 of relay 22, make contact 193 of relay 19, wiper *b* of switch L in position 3, relay 26, battery. Relay 26 operates, short circuits impulse springs I3 at make contact 261 of relay 26, closing the circuit betwen wires EA' and EB'.

It will be noted that in the case when number 0 is received, corresponding to code B0BA and to the operation of relays 21, 23, 20, switch L moves 19 steps and opens the loop of wires EA', EB', ten times. It then comes back to rest position 0 and short circuits by its wiper *c* the above mentioned wires thus closing the circuit.

I claim:

1. In a telecommunication system, a signaling circuit having incoming lines, a first and second signal receiving relay connected to said lines, a third signal receiving relay having an energizing circuit including the contacts of the first and second relays, a first group of condensers, means for charging condensers in accordance with signals received by the first relay, a second group of condensers, switching means for charging condensers of the second group in accordance with signals received by the second relay, circuits for the switching means alternatively controlled by the three signal relays, and a discharge circuit for each condenser including a signal repeating relay.

2. The system according to claim 1, an additional group of condensers, and means controlled by the switching means for connecting the additional condensers in parallel with the charging and discharging circuits of the first group.

3. The system according to claim 1, a signal repeating circuit controlled by the signal repeating relays, an interrupter in the signal repeating circuit, and a relay for short circuiting said interrupter controlled by said impulse repeating relays.

4. In a telecommunication system, a signaling circuit having incoming lines, a first and a second signal receiving relay connected to said lines a third signal receiving relay, an auxiliary relay for each signal receiving relay, multi-position switch having a plurality of groups of terminals and wipers cooperating with them controlled by an operating magnet, a first group of condensers, a circuit for charging one condenser after the other under the control of the first signal receiving relay and its auxiliary and one wiper of the switch in successive positions thereof, a second group of condensers, a circuit for charging one condenser after the other of the second group under the control of the second signal receiving relay and its auxiliary and a second wiper of the switch in successive positions thereof, an operating circuit for the magnet of the switch alternatively controlled by the three signal relays and their auxiliaries, and circuits for the auxiliary relays controlled by the associated signal receiving relay and the switch magnet, a circuit for the third signal receiving relay including contacts of the first and second signal receiving relays and a third wiper of the switch in predetermined positions thereof, and a discharge circuit for each condenser including a signal repeating relay.

5. In a telecommunication system, incoming lines, a signaling circuit having a first signal receiving relay connected to said lines, a signaling circuit having a second signal receiving relay connected to said lines, a third signal receiving relay, an auxiliary relay for each signal receiving relay, a first and a second multi-position switch each having a plurality of groups of terminals and wipers cooperating with them controlled by an operating magnet, a first group of condensers, a circuit for charging one condenser after the other while the first signal receiving relay is energized and its auxiliary deenergized, said circuit including one wiper of the first switch in successive positions thereof, a second group of condensers, a circuit for charging one condenser after the other of the second group, while the second signal receiving relay is energized and its auxiliary deenergized, the last mentioned circuit including a second wiper of the first switch in successive positions thereof, an energizing circuit for the magnet of the first switch having three parallel paths, each path controlled by a front contact of a different signal relay and a back contact of its auxiliary, and an energizing circuit for each auxiliary relay controlled by a back contact thereof and a front contact of the associated signal receiving relay, a short circuit for each auxiliary relay controlled by its back contact and a back contact of the first switch magnet, an energizing circuit for the third signal receiving relay including back contacts of the first and second signal receiving relays and a third wiper of the first switch in predetermined positions thereof, a discharge circuit for each condenser including a different wiper of the second switch in one position thereof, and a back contact and winding of a signal repeating relay in each discharge circuit.

6. The system according to claim 5, and a third switch having groups of terminals and wipers cooperating with them under the control of an operating magnet, a signal repeating circuit including two wipers of the third switch, connections from successive terminals with which one of said two wipers cooperates to different ones of the signal repeating relays connected with the condensers of the first group, connections from successive terminals with which the other one of said two wipers cooperates to different ones of the signal repeating relays connected with the condensers of the second group, a third wiper of the third switch in the circuit of the second switch magnet, locking circuits for the signal repeating relays including said third wiper, and interrupter contacts in the circuit of the magnet of the third switch.

7. The system according to claim 5, an additional group of condensers connected in parallel with the charging and discharging circuits of the first group in supplementary positions of the first switch over the first mentioned wiper thereof and said wipers of the second switch in another position thereof.

8. The system according to claim 5, an interrupter in the repeating circuit, a relay for short circuiting said interrupter and circuits for the last mentioned relay controlled by said impulse repeating relays in successive positions of the third switch.

ROGER LOUIS MARIE LE QUÉAU.

REFERENCES CITED

The following references are of record in the file of this patent:

UNITED STATES PATENTS

| Number | Name | Date |
|---|---|---|
| 2,006,582 | Callahan | July 2, 1935 |
| 2,056,265 | Germanton | Oct. 6, 1936 |
| 2,072,079 | Blodgett | Mar. 2, 1937 |
| 2,272,590 | Swartzel | Feb. 10, 1942 |

Certificate of Correction

Patent No. 2,517,578 August 8, 1950

ROGER LOUIS MARIE LE QUÉAU

It is hereby certified that error appears in the above numbered patent requiring correction as follows:

In the grant, line 15, strike out the words "of seventeen years"; same line, after "grant" insert *until May 28, 1966*; in the heading to the printed specification, line 9, before "8 Claims" insert the following:

*Section 1, Public Law 690, August 8, 1946. Patent expires May 28, 1966* and that the said Letters Patent should be read as corrected above, so that the same may conform to the record of the case in the Patent Office.

Signed and sealed this 12th day of December, A. D. 1950.

[SEAL]

THOMAS F. MURPHY,
*Assistant Commissioner of Patents.*